(No Model.)
J. C. WYGANT.
DRAG SAW MACHINE.
No. 271,968. Patented Feb. 6, 1883.
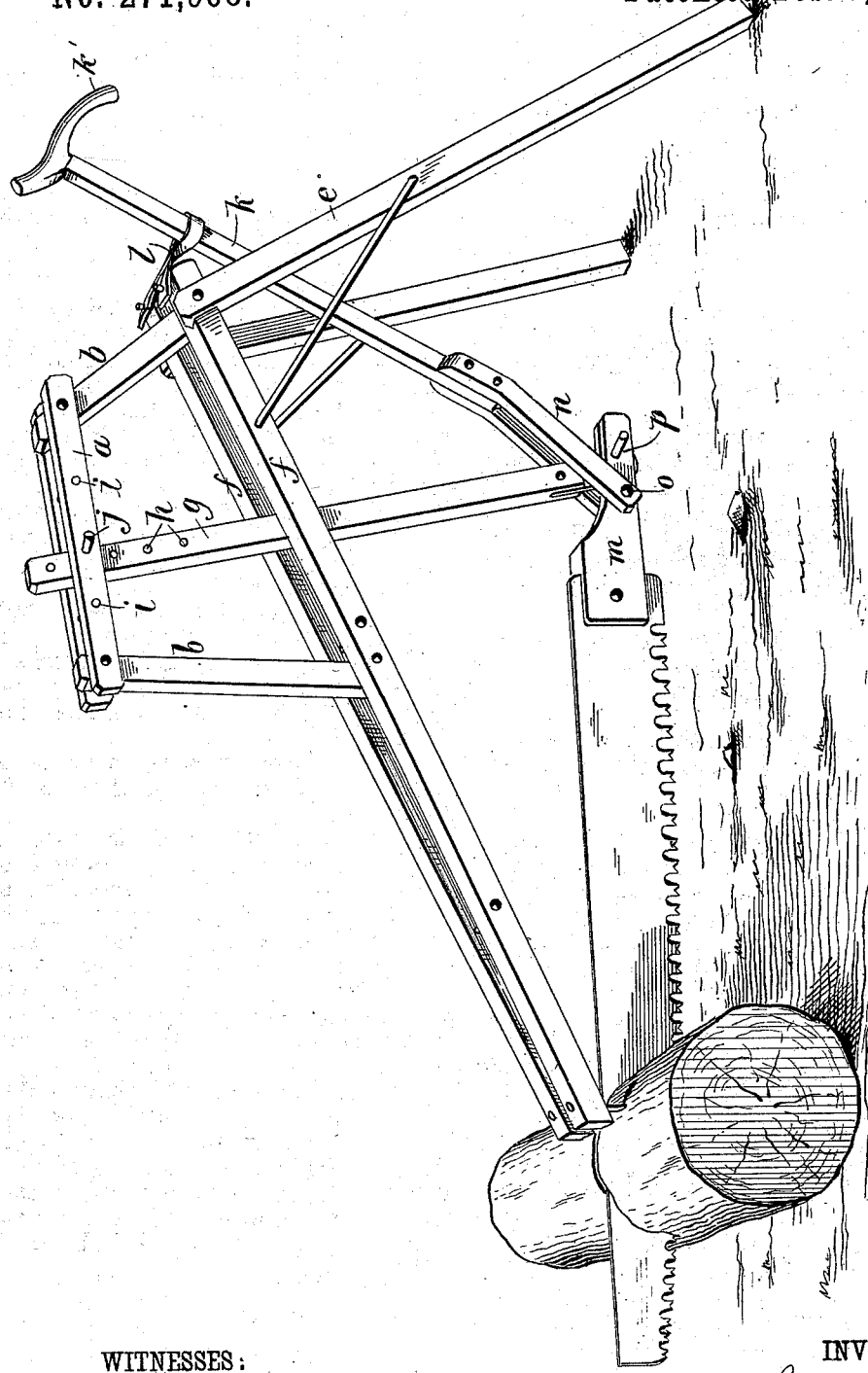
WITNESSES:
INVENTOR:
BY
ATTORNEYS.

UNITED STATES PATENT OFFICE.

JOHN C. WYGANT, OF OUTVILLE, OHIO.

DRAG-SAW MACHINE.

SPECIFICATION forming part of Letters Patent No. 271,968, dated February 6, 1883.

Application filed October 4, 1882. (No model.)

*To all whom it may concern:*

Be it known that I, JOHN C. WYGANT, of Outville, in the county of Licking and State of Ohio, have invented a new and Improved Sawing-Machine, of which the following is a full, clear, and exact description.

My invention relates to hand crosscut-sawing machines in which the saw is suspended at its shank by a pendulum and has a handle attached thereto for working it; and the invention consists in the arrangement of the pendulum for adjustability and control, all as hereinafter fully described.

Reference is to be had to the accompanying drawing, forming part of this specification, in which the figure is a perspective view of my improved machine.

My invention consists of the extension-bench $a\ b$, above the main bench $e\ f$, for the connection of the pendulum $g$ to bars $a$, instead of the part $f$ of the main bench, as it has been heretofore arranged, the object being to get a longer sweep of the pendulum for easier and better operation, and for enabling it to swing between the bars $f$ of the main bench to prevent it from lateral play, to which such pendulum arrangements are subject when suspended directly from bars $f$ without such guide. The longer sweep thus obtained for the pendulum materially lessens the vertical swing of the saw, and thus enables it to run much easier and smoother. The pendulum is provided with a series of holes, $h$, for shifting it up or down, and it is adjustable along the bars $a$ by the series of holes $i$, in which it is suspended by the pin $j$ to set it, as may be required by the nature of the work in hand. The stock $k$, to which the handle $k'$ is attached, is branched for connection to the saw-shank $m$ by arms $n$ and pivot $o$, and the pivot $p$, by which the pendulum $g$ is connected to the saw-shank, is constructed with projecting heads, on which the branches $n$ may rest for a fulcrum to raise the saw by depressing the handle, which is frequently required in adjusting the saw on the log. The stock $k$ is supported from the frame in the flexible strap $l$, which may serve as a guide to the moving stock, or simply as a support therefor when the saw is not in use. The saw being thus controlled and guided, and working with greater ease and steadiness, enables the frame to be made very light and easy to be handled.

I am aware that a saw-guide jointed to a rocking frame and provided with a notched head adapted to be engaged by a spring-catch operated by a lever has heretofore been employed, and I therefore do not claim such invention.

Having thus described my invention, what I claim as new, and desire to secure by Letters Patent, is—

1. The combination, with the main bench $e\ f$, of the extension-bench $a\ b$, secured to and projecting above the main bench, and provided with the holes $i$, the saw-pendulum $g$, provided with the holes $h$, and pivoted to the extension-bench, and working between the parallel bars of the main bench and the pins $j$, substantially as herein shown and described, whereby the pendulum can be adjusted both vertically and horizontally, as set forth.

2. The combination, with the saw-shank $m$, of the pendulum $g$, connected to said shank by pivot having extension or rests $p$, and the branched handle-stock $k\ n$, pivoted to said shank in front of said extensions or rests, substantially as herein shown and described.

JOHN C. WYGANT.

Witnesses:
K. M. COLE,
R. PALMER.